F. T. DOW.
PEAT PRODUCT.
APPLICATION FILED NOV. 15, 1919.

1,414,344.

Patented May 2, 1922.

Inventor.
Fred T. Dow
by Heard Smith & Tennant.
Attys.

UNITED STATES PATENT OFFICE.

FRED T. DOW, OF BANGOR, MAINE.

PEAT PRODUCT.

1,414,344.　　　　Specification of Letters Patent.　　Patented May 2, 1922.

Application filed November 15, 1919. Serial No. 338,344.

*To all whom it may concern:*

Be it known that I, FRED T. DOW, a citizen of the United States, residing at Bangor, county of Penobscot, State of Maine, have invented an Improvement in Peat Products; of which the following description, in connection with the accompanying drawing, is a specification, like characters on the drawing representing like parts.

This invention relates to a novel peat product.

As a result of some experiments I have been making with peat, I have discovered that if peat which has been macerated and reduced to a pulpy constituency is then further treated so as to form it into what I call pencil or stick-like fragments, that is, into elongated fragments which are not greater in diameter than one-quarter of an inch, it is then in such condition that it can be readily and rapidly dried, and when dried can be easily formed into briquets of desired size, simply by subjecting it to heat and pressure.

My invention, therefore, covers peat when reduced to this pencil-like or stick-like fragmentary condition.

An apparatus capable of producing peat having the above characteristics comprises a member in the form of a perforated plate or screen having small apertures therethrough of the diameter desired for the stick-like fragments and means for rubbing and forcing the peat through said apertures. As the peat is thus forced through these small apertures, it emerges therefrom in small tentaculiferous streams. These separate streams of peat break into short lengths as they emerge from the screen-like member so that the final form which the peat assumes is that of small fragments having the diameter of the holes in the screen-like member and varying lengths. The operation of rubbing the peat through these apertures compresses and condenses the peat so that the peat comprising each small stick-like fragment is compressed compactly together. Moreover, as the separate streams issue from the apertures in the sieve and break off at different lengths they are apt to curl slightly so that the final fragments are not necessarily straight but some of them may be curved in the direction of their length. These stick-like fragments will retain their shape, can be readily handled, and because of their general curved shape they form when collected together a more or less porous bulk through which a drying medium may be readily forced. Peat, therefore, which has been reduced to pencil or stick-like fragments of this type can be readily dried because when placed on screens in bulk the drying medium is easily forced through the bulk because of the porous character thereof. Moreover, such peat when dried can be easily briqueted by subjecting it to heat and pressure, as above stated.

Figure 1:
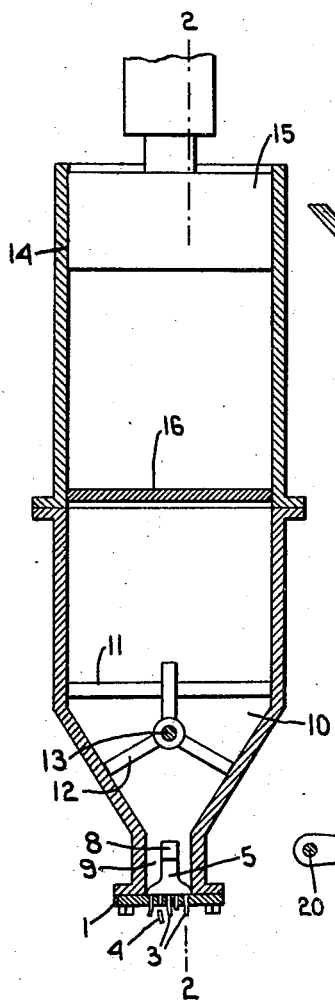
Fig. 1 is a vertical section through an apparatus adapted to produce my improved peat product, said section being taken on the line 1—1, Fig. 2.
Figure 2:
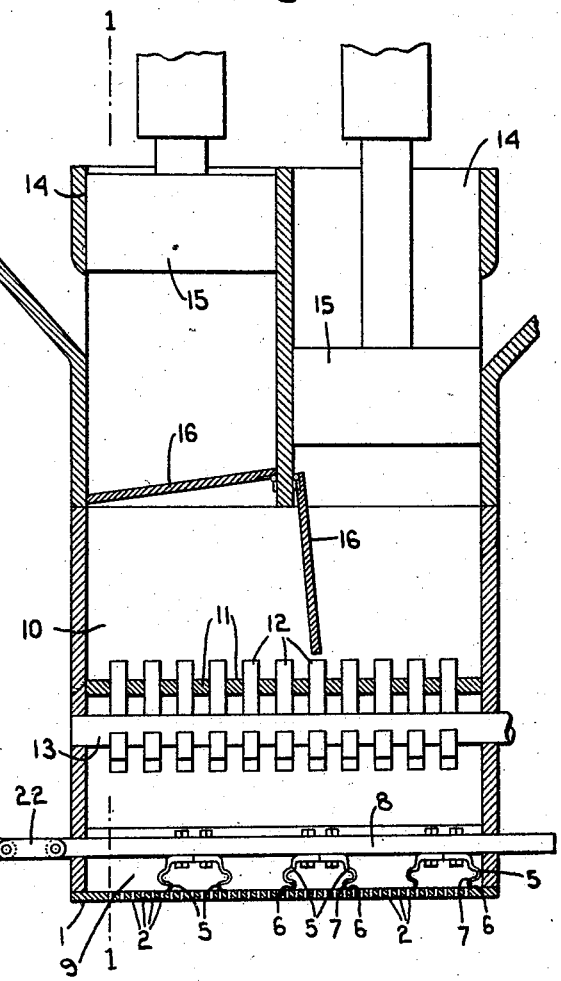
Fig. 2 is a section on the line 2—2, Fig. 1.
Figure 3:
Fig. 3 shows some individual stick-like fragments.
Figure 3:
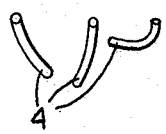

In the drawings 1 indicates a screen or perforated plate having a plurality of small apertures 2 therethrough. While the size of these apertures is not essential to the invention, yet I find best results are secured when the apertures are about an eighth of an inch to a quarter of an inch in diameter. If peat in a macerated, pulpy condition is forced or rubbed through these apertures 2, it will emerge from the plate 1 in small streams or jets 3, and because of the pressure necessary to force the peat through these apertures, the peat in each stream will be firmly compacted together. As the streams emerge from the apertures they will break off at different lengths to form the stick-like fragments 4, and a considerable proportion of such fragments will curl more or less as they break, so that the resulting mass of stick-like fragments is a more or less porous mass.

Various devices may be employed for forcing or rubbing the peat through the apertures 2. One practical device comprises members in the form of rubbing knives which are arranged to be moved over the upper surfaces of the screen plate 2, said knives being constructed so that in their movement in one direction they will cut the peat and in their movement in the other direction they act as rubbers to rub the peat through the apertures. These rubbing knives are shown at 5, each knife being in the form of a curved spring blade having a cutting edge 6 which engages the upper surface of the screen member 1. The knife is so shaped that the under face 7 thereof forms a rubbing face. When each knife is moving forwardly, the cutting edge 6 thereof serves to cut the peat, and when it is moving in the opposite direction the rubbing surface 7 has a rubbing action which forces the peat through the apertures 2. I have shown these knives 5 as secured to a reciprocating carrier 8 and as arranged in pairs, the knives of each pair being oppositely directed so that upon movement of the carrier 8 in each direction part of the knives will be cutting the peat and the remainder of the knives will be rubbing the peat through the perforations 2.

The screen plate 1 is shown as forming the bottom of a trough 9 in which the carrier 8 and knives 5 are received, and this trough communicates with a hopper or chamber 10 into which peat may be fed by any suitable means. This hopper or chamber is provided with means for cutting or macerating the peat, such means being herein shown as a plurality of grate bars 11 extending transversely of the hopper, and a plurality of cutting knives 12 which are mounted on a shaft 13 and which co-operate with the bars 11 to cut and macerate the peat. The carrier 8 is of a less width than the trough 9 and the knives 5 will preferably be formed with the wide cutting edge 6 and rubbing surface 7 which extends substantially across the trough 9, and with the narrow shank portion which is secured to the carrier 8. With this construction the carrier 8 and knives do not interfere with the feeding of the peat to the screen member 1.

For feeding the peat to the hopper 10, I have shown a plurality of feeding cylinders 14 leading to the hopper 10, and each provided with a feed plunger 15 for forcing the peat through said cylinder into the hopper. Each cylinder is formed at its lower end with a pivoted gate 16 which opens downwardly automatically as the peat is forced therethrough, but which will close to prevent the peat from being forced upwardly through the cylinder. The plungers 15 will preferably be operated successively so that while one plunger is moving downwardly to force peat through its cylinder into the hopper the other plunger will be moving upwardly. The pivoted gates 16 prevent the peat from being forced upwardly through the cylinder in which the plunger is retracting and thus compel the peat to be forced downwardly through the grates 11 into the hopper 10.

The carrier 8 may be reciprocated in any suitable way I have herein shown for this purpose a shaft 20 having a crank arm 21 which is connected by a link 22 to one end of the carrier that projects through the end of the trough 9.

The peat product which is formed by means of this invention has the advantage that it might be very quickly dried. The peat is formed into the stick-like fragments while it is still moist, and when thus formed it can be dried completely in a very short time merely by introducing it into a drying oven. This is because of the fact that the individual fragments have a relatively small diameter and can be easily heated clear through and because of the further fact that a mass of these stick-like fragments is very porous so that when it is placed in a drying chamber the drying medium can readily penetrate through the mass. This is a decided advantage because in the manufacture of peat the operation of drying the peat is usually one that takes considerable time.

With my invention however the time required for this step is reduced to a minimum.

Moreover I have found that a peat product having the characteristics above pointed out can be easily formed into briquets by pressure and heat and since the drying is done before the briqueting process, the latter can be accomplished in a relatively short time.

While I have illustrated herein one apparatus adapted to produce my improved peat product I wish to state that this is shown merely for illustration purposes and not with the intention of limiting the invention.

I claim:

1. A peat product in the form of stick-like fragments of closely-compacted peat, each having a very small transverse dimension which is substantially uniform from one end of the fragment to the other.

2. A peat product in the form of stick-like fragments of closely-compacted peat, each fragment having a diameter considerably less than half an inch and some at least of the fragments being curved in the direction of their length.

3. A peat product in the form of elongated fragments of closely-compacted peat, each having a diameter of less than a quarter of an inch.

4. A peat product in the form of individual stick-like fragments of closely-compacted peat, each fragment having a substantially uniform cross-sectional dimension from one end to the other which is considerably less than half an inch.

In testimony whereof, I have signed my name to this specification.

FRED T. DOW.